Feb. 4, 1941.  R. W. DOORNBOS  2,230,290
FAUCET
Filed Dec. 9, 1939  2 Sheets-Sheet 1

INVENTOR.
Roy W. Doornbos
BY U. G. Charles
ATTORNEY.

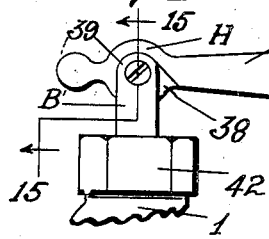
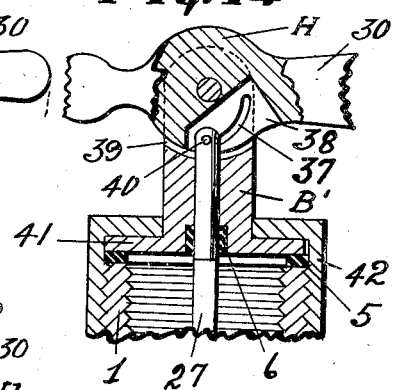
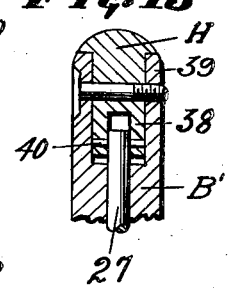
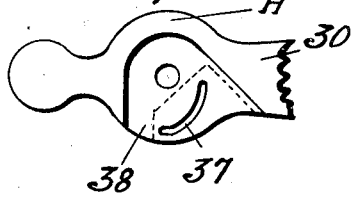
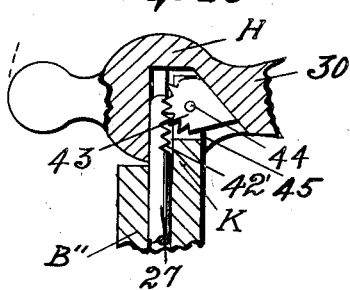
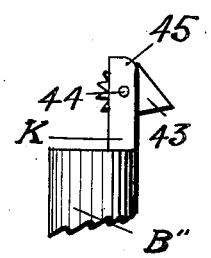
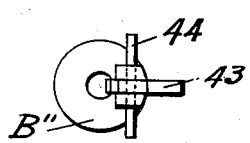
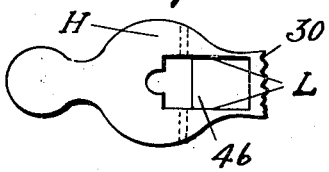
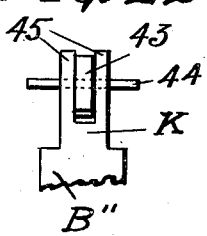

Patented Feb. 4, 1941

2,230,290

UNITED STATES PATENT OFFICE 2,230,290

FAUCET

Roy W. Doornbos, Wichita, Kans.

Application December 9, 1939, Serial No. 308,455

2 Claims. (Cl. 277—18)

My invention relates to improvements in a faucet, and has for its principal object means to proportionately cause mixing of hot and cold water as it passes through.

A further object of my invention is to provide a faucet having inlets for hot and cold water, separately.

A still further object of my invention is to provide a faucet having a duct for each hot and cold water supply whereby the hot or cold water selectively may be drawn from the faucet.

A still further object of my invention is to provide a faucet having hot and cold water ducts separately arranged and each adapted to communicate with a mixing chamber arranged in the faucet, said chamber to discharge through an appropriate drain spot as a part of the faucet structure.

A still further object of my invention is to provide a faucet having a stem and a handle to actuate the stem movement in such a way as to draw hot or cold water separately or simultaneously and means to proportionately mix the hot and cold water for a desired temperature as dispensed by the faucet.

Referring to the drawings:

Fig. 13 is a side view as modified for the upper portion of the faucet, parts removed for convenience of illustration.

Fig. 14 is an enlarged sectional view longitudinally through Fig. 13.

Fig. 15 is an enlarged sectional view taken on line 15—15 in Fig. 13.

Fig. 16 is an inverted view of the handle structure.

Fig. 17 is a side view of Fig. 16.

Fig. 18 is a sectional view of another modification, illustrating a rack and gear movement for the stem.

Fig. 19 is a similar view to that of Fig. 18, the handle being removed.

Fig. 20 is a plan view of Fig. 19.

Fig. 21 is an inverted view of the handle portion.

Fig. 22 is a transverse side view of Fig. 20, showing the outer pointed edge of the rack gear.

Figure 1:
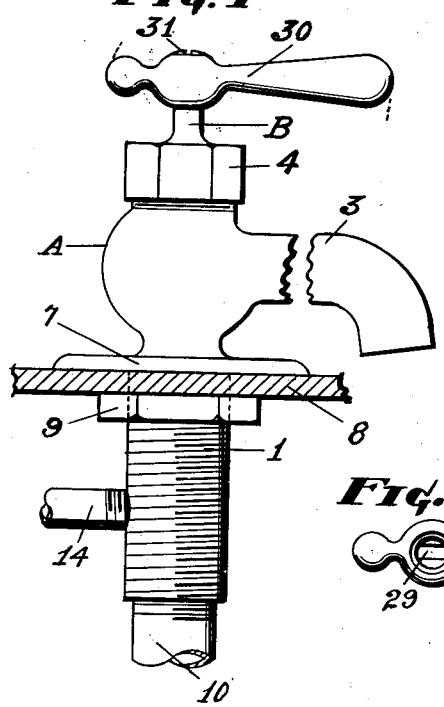
Fig. 1 is a side view of the faucet, the spout and supply partially removed.

My invention herein disclosed consists of certain novel features embodied in a single faucet, whereby hot and cold water may be dispensed separately or simultaneously through a mixing chamber adjacent the exit spout, and furthermore the invention involves a principle whereby the temperature of the water as dispensed may be varied by controlling the volume of the flow of each hot and cold water supply through the medium of valves, the coaction of which is subject to the movement of a handle, selectively, that is to say, by vertical rocking movement of the handle or turning the same on the axis of the faucet body.

The component parts of the faucet consist of a body 1, cylindrical in form with respect to cross section, and having a mixing chamber 2, the shell A of which is integrally joined and being inward a short distance from one end of the body and a spout 3, laterally extending from the mixing chamber and communicating therewith, said end of the body being bored axially, communicating with said chamber and being threaded internally and externally, the external threads adapted to receive a cap 4 threadedly engaging thereon and made fluid tight through the medium of a gasket 5 and a packing 6 seated in the inner end of a bore axially through the cap, said cap having a neck B extending outward.

The said body has an annular flange 7 adjacent its mixing chamber integrally joined to function as a seat for the faucet when engaged by its extension through an apertured structure 8. The said structure 8 may be the splasher back of a sink, or the top rim of a lavatory, and the said flange being secured to snug engagement by a nut 9 threadedly engaging on the body portion, said portion being threaded from its end toward the flange, said end being axially bored and threaded internally a spaced distance inward to receive the threaded end of a pipe 10 to function as a conductor preferably for cold water to the said mixing chamber, through the medium of a plurality of ducts 11 extending longitudinally through the body, and being in parallelism with its axis, and spaced therearound, the said ducts discharging in an annular channel 12 adjacent the mixing chamber and communicating therewith.

Figure 2:
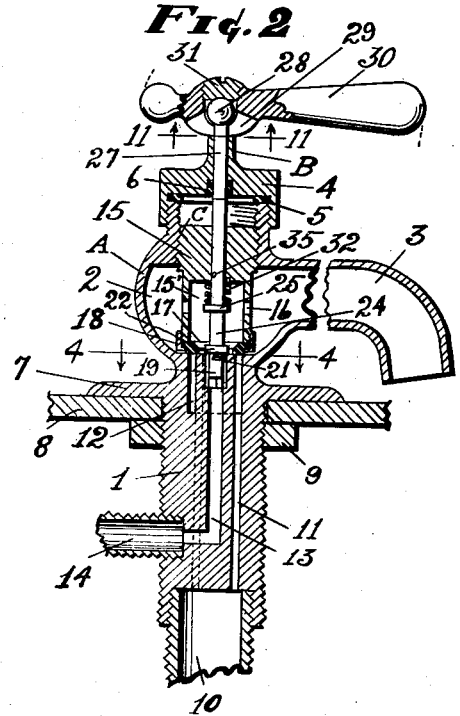
Fig. 2 is a longitudinal section through the faucet and pipe connections.

Axially positioned in the body portion is a duct 13 adapted to communicate with the said mixing chamber, at which point and for a spaced distance along, the duct is octagonal, and being enlarged for the purpose later described, the duct at the other end having a right angle bend to communicate with a pipe 14 that threadedly engages in the side of the body as shown in Figs. 1 and 2, and the said pipe being a conductor for hot water; and the said pipes being connected with the mixing chamber is means to provide hot and cold water separately or simultaneously in proportion for a desired temperature as discharged therefrom.

The control for the cold water is through the medium of a valve structure 15 having a cavity as at 15', one end of the valve structure being threaded as at C to threadedly engage with the internal threads of the first said end portion of the body; and when turned reciprocatingly the other end of the valve structure will open and close the annular channel, permitting the flow into the mixing chamber externally and internally, the internal flow being through a plurality of apertures 16 in the shell of the cavity communicating with the mixing chamber.

Figure 4:
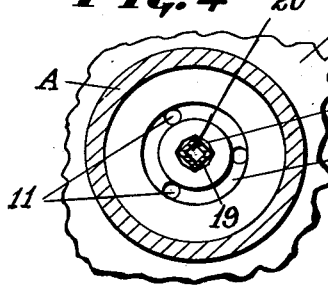
Fig. 4 is an enlarged cross section taken on line 4—4 in Fig. 2 looking in the direction of the arrows.
Figure 3:
Fig. 3 is a top view of the handle adjacent its connection to the faucet.

To render the valve structure fluid tight where it seats on the end of the annular channel is an annular washer 17 that is removably secured to the open end of the cavity by a flanged collar 18, threadedly engaging on the shell of the cavity, the flange seating on a shoulder E formed on the periphery of the washer, binding the washer snugly to the end of the shell; the valve being so arranged will permit an independent control for the hot water supply which is through the medium of a jointed stem, the inner end joint of which is rectangular as at 19 to slideably engage in the said octagonal portion of said duct 13, said rectangular portion being hollow as at 20 and provided with a pair of exit slots 21 oppositely disposed through the wall thereof as an exit for water, and in close proximity to a fibrous disc 22, centrally apertured, through which a threaded stem 23 from the rectangular portion will engage to clamp the disc between the shoulder F and the end of joint 24 as the said threaded stem engages in a threaded bore G of last said joint, and by longitudinal reciprocating movement of the stem proper the disc 22 is moved to and from its seating position over the octagonal end of duct 13 as shown in Figs. 2 and 4 to permit a flow of water external of the rectangular portion 19, as well as therethrough when the valve is open, it being understood that the corners of the rectangular portion will engage in corresponding angles of the octagonal opening and adapted to slideably engage therein and retained against turning movement for the purpose later described.

Figure 5:
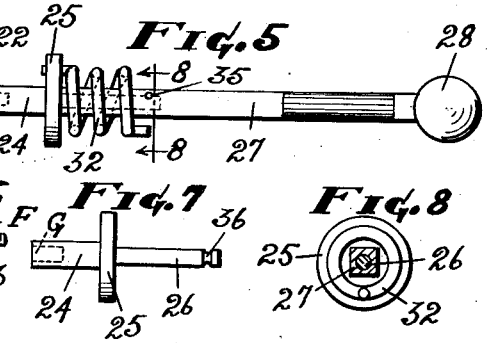
Fig. 5 is an enlarged side view of the stem assembly.
Figure 6:
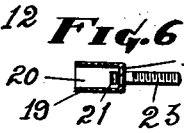
Fig. 6 is a side view of the lower member of the stem as a retainer for its respective disk.
Figure 7:
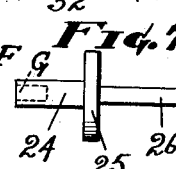
Fig. 7 is a side view of an intermediate portion of the stem on which the spring seats.
Figure 8:
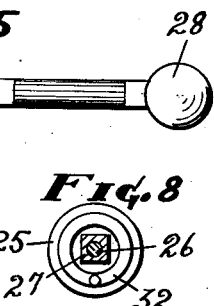
Fig. 8 is a sectional view taken on line 8—8 in Fig. 5.

It will be seen that joint member 24 opposite its axially bored end above described has a flange 25 integrally joined and a cylindrical pin 26 axially positioned to engage in a smooth axial bore of joint 27 of the stem as shown in Fig. 5, whereby a swivel is formed and secured as later described, last said joint axially extending through the body of said valve structure 15, and adapted to turn the same as the portion of the stem engaged by the valve structure, is rectangular in cross section, as well as the aperture extending through the valve structure, said valve to move longitudinally when turned by its threaded engagement in the body of the faucet, and the portion of said stem from the valve structure outward to a spaced distance from a ball 28 is cylindrical to turn or move longitudinally in the bore of the cap with a smooth running fit, while the portion adjacent the ball is rectangular to engage rockably in a slot 29 of a handle 30, the ball being the pivot point to permit vertical rocking movement of the handle and the slot to accommodate for such movement, and to turn the stem when the handle is rocked on a horizontal plane. To retain the ball socketed in the handle is through the medium of a threaded plug 31 that engages in a threaded aperture in the handle axial with the stem, and by removing the plug the stem may be placed and removed from the handle.

Said stem is moved longitudinally through the medium of the arcuate form of the handle portion in contact with the end of the cap neck, functioning as a cam when the handle is rocked vertically.

It will now be seen the method by which hot and cold water is drawn by turning or rocking movement of the handle selectively or simultaneously for a desired temperature when discharged from the mixing chamber.

Figure 9:
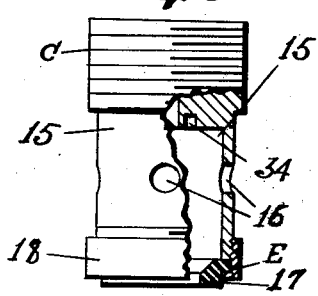
Fig. 9 is an enlarged side view of the valve structure to control the annular channel outlet, parts removed for convenience of illustration.
Figure 10:
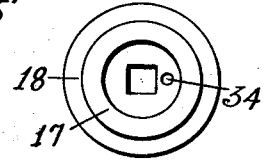
Fig. 10 is a lower end view of Fig. 9.
Figures 11, 12:
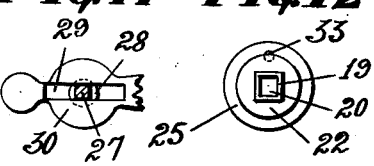
Fig. 11 is an inverted view of the handle taken on line 11—11 in Fig. 2.
Fig. 12 is an inner end view of the stem.

Wound on the stem in working relation to its swivel and being in the cavity of the valve structure 15 is a coil spring 32, each end portion of which has a right angle bend to engage in their respective apertures 33 and 34, one of which extends through the said flange element 25, and the other being in the head of its cavity as shown in Fig. 9, by which means when the stem is turned by its handle 30, the cold water supply may be opened manually and closed by said spring, while the valve control for the hot water is accomplished by vertical rocking movement of said handle as the same rockably engages on the outer end of the cap neck as above described. The said spring also functions as closing means for the hot water valve by longitudinal movement of its respective section of the stem, which is rectangular and void of rotation, and likewise its respective end of said spring thereto attached, while the other end of the spring, being secured to the valve cavity head, is adapted to retract said valve structure as an automatic closing means when manually opened, it being understood that the said cold water valve is free to rotate on a swiveled pin 26 that is retained against longitudinal movement by an eccentrically positioned pin 35 through the stem portion 27, and adapted to seat in an annular groove 36 at near the outer end of said pin 26 to permit free rotation thereof.

In Figs. 13 to 17 inclusive is illustrated a modification of the structure to open and close the hot water valve by vertical rocking movement of the handle from a horizontal plane downward. Fig. 14 shows the valve closed when the handle is horizontally disposed, and when the handle is rocked downward, the valve will be opened through the medium of a cam arrangement, consisting of arcuate slots 37 through a pair of ears 38 integral with the handle adjacent its hub H that is centrally pivoted on neck B', the radii of the arcs being eccentric to the pivot point of the hub, said neck having ears 39 spaced apart to receive the ears 38 in the hub of the handle, and between which the upper end of the valve stem is positioned and having a pin 40 inserted so that each end thereof will engage in their respective arcuate slots, whereby a cam is formed to raise the valve from engagement by a downward rock of the handle.

A further modification in the said views relates to the arrangement of the neck, which has on its base an annular flange 41 to seat on the upper end of the faucet body, and having a similar gasket 5 as water tight sealing means, and being tensioned thereon by a threaded collar 42 engaging on the upper end of said body that is likewise threaded, and the said collar having its head axially bored to engage on the said flanged neck of such tension to permit turning by horizontal movement of the handle, such movement being means to open the cold water valve.

A further modification with respect to opening the hot water valve is illustrated in Figs. 18 to 22 inclusive, in which arrangement the upper end of the jointed stem is toothed as at 42′ along a portion of its length, whereby a rack is formed, and being in mesh with the teeth of a gear 43 that is secured against rotation in the hub of the handle, and by vertical rocking movement of the handle will open and close the said valve. It will be seen that the handle and the gear is pivoted at the same point by a pin 44 extending therethrough and through a pair of ears 45 integral with an upper extension K on the end of neck B″, the ears being spaced apart to receive the gear, and said ears engaging in the walls L of an opening 46 positioned in the handle hub; the ears being so positioned and pivotally connected to the handle, is means to turn the stem on its axis, said turning movement adapted to open the cold water valve independent or simultaneous with the hot water valve when the handle is rocked downward and turned, and such other modifications may be made as lie within the scope of the appended claims.

Having fully described my invention what I claim as new and desire to secure by Letters Patent is:

1. In a faucet, a faucet of the class described, comprising in combination a body portion having a mixing chamber a spaced distance from one end, said end portion being bored and threaded to where it joins the chamber, and a cap secured to the end of the body adjacent the chamber, the cap axially bored, said body having hot and cold water ducts longitudinally extending therethrough from its other end and communicating with the mixing chamber, and pipes connected to the body as a supply for hot and cold water and being in registry with their respective ducts, one of said ducts axially positioned in the body and being polygonal where it enters the mixing chamber and for a spaced distance therefrom, a stem having a swivelled joint intermediate of its ends, the portion of the stem housed within the body being rectangular in cross section and being cylindrical where engaged by the body cap and adapted to turn and slide longitudinally therein, the inner end of the rectangular portion to slideably engage in the polygonal end of the duct, and having a disc to open and close the duct by functioning as a valve, and being retained against rotation while the other portion of the stem is free to turn at the swivel, a handle pivotally connected to the outer end of the stem in such a way as to move the stem longitudinally and turn the adjacent portion of the stem at the swivel, a valve structure threadedly engaging in the bore of the body and being turned by the stem to open the valve, and a coil spring positioned on that portion of the stem on which the handle is positioned, means to connect one end of the spring to the valve body and means to secure the other end to that portion of the stem secured against rotation, by which means both valves are closed automatically when the handle is released.

2. In a faucet, of the class described comprising a body having an inner and an outer end portion, and a mixing chamber intermediate of said end portions, the outer end portion being bored and threaded to where it joins the chamber, a valve structure having a cavity formed in one end thereof, the shell of which is apertured, the other end portion being threaded externally to engage in the threaded bore of the body, said last end portion of the valve structure having an opening axially therethrough, a necked cap to close the bore at the outer end of the body, said cap being axially bored, the body having hot and cold water ducts longitudinally extending therethrough from its inner end and communicating with the mixing chamber, pipes connected to the body as a supply for hot and cold water, communicating with their respective ducts, one of said ducts axially positioned in the body and being polygonal in contour where it enters the mixing chamber and for a spaced distance inward of the body, there being an annular channel surrounding said last duct and communicating with the other duct and the mixing chamber, a stem having a swivelled joint intermediate of its ends, the joint being within the cavity, means where the stem extends through the opening of the threaded portion of the valve structure to turn said valve structure and to move longitudinally therein whereby the valve is moved longitudinally of the body to open and close the annular channel, and a disc on the stem to close the polygonal end of the axial duct, and the end of the stem being rectangular to engage in the angles of the polygonal opening to avoid turning of the stem below the swivelled joint and to permit the flow of water from the polygonal opening, and a handle pivotally connected to the outer end of the stem and seating on the outer end of the cap neck to move the stem longitudinally and turn the adjacent portion of the stem at the swivel.

ROY W. DOORNBOS.